(12) United States Patent
Koke

(10) Patent No.: US 11,517,153 B2
(45) Date of Patent: Dec. 6, 2022

(54) REMOVABLE HANDLE FOR COOKING UTENSIL

(71) Applicant: Gregory Darren Koke, Bohemia, NY (US)

(72) Inventor: Gregory Darren Koke, Bohemia, NY (US)

(*) Notice: Subject to any disclaimer, the term of this patent is extended or adjusted under 35 U.S.C. 154(b) by 329 days.

(21) Appl. No.: 16/883,733

(22) Filed: May 26, 2020

(65) Prior Publication Data

US 2020/0281412 A1    Sep. 10, 2020

Related U.S. Application Data

(63) Continuation-in-part of application No. 15/861,290, filed on Jan. 3, 2018, now Pat. No. 10,660,478.

(60) Provisional application No. 62/521,503, filed on Jun. 18, 2017, provisional application No. 62/441,702, filed on Jan. 3, 2017.

(51) Int. Cl.
*A47J 45/10* (2006.01)

(52) U.S. Cl.
CPC .................... *A47J 45/10* (2013.01)

(58) Field of Classification Search
CPC ........ A47J 45/06; A47J 45/061; A47J 45/062; A47J 45/07; A47J 45/071; A47J 45/08; A47J 45/10; A45F 5/10; B65D 25/28; B65G 7/12
USPC ............................ 16/110.1, 422, 425, 426
See application file for complete search history.

(56) References Cited

U.S. PATENT DOCUMENTS

| | | | |
|---|---|---|---|
| 370,395 A * | 9/1887 | Hurford | B25G 1/04 16/110.1 |
| 402,292 A | 4/1889 | Angevine | |
| 452,121 A * | 5/1891 | Kendrick | A47J 45/10 294/33 |
| 602,324 A | 4/1898 | Hautsch | |
| 749,753 A | 1/1904 | Soisson | |
| 901,400 A | 10/1908 | Vincent | |
| 938,187 A * | 10/1909 | Walker | A47J 45/10 294/34 |
| 940,422 A * | 11/1909 | Ballman | A47L 13/52 220/756 |
| 1,515,038 A * | 11/1924 | Hamilton | A47J 45/10 294/31.1 |
| 2,450,193 A * | 9/1948 | Galliano | A47J 45/10 294/27.1 |
| 2,985,095 A * | 5/1961 | Pitavy | A47J 37/10 220/759 |
| 3,409,935 A | 11/1968 | Wishnick | |
| 5,704,092 A * | 1/1998 | Nicollet | A47J 45/10 220/759 |
| 6,393,973 B1 | 5/2002 | Velo | |
| D658,433 S | 5/2012 | Zemel | |
| D682,018 S | 5/2013 | Zemel | |
| 2007/0266526 A1 | 11/2007 | Buckingham | |

(Continued)

*Primary Examiner* — Roberta S Delisle
(74) *Attorney, Agent, or Firm* — The Farrell Law Firm, P.C.

(57) ABSTRACT

A removable handle for a cooking utensil is provided. The removable handle includes a proximal end including a gripping surface, a distal end including a plurality of tines, and an elongated shaft extending from the proximal end to the distal end and being bent so that the distal end including the plurality of tines are oriented at an angle that is greater than 45°.

15 Claims, 12 Drawing Sheets

(56) References Cited

U.S. PATENT DOCUMENTS

2008/0110910 A1    5/2008  Kleppin
2008/0179211 A1*   7/2008  Kutsch .................... A47J 45/07
                                                    220/573.1

* cited by examiner

REMOVABLE HANDLE FOR COOKING UTENSIL

PRIORITY

This application is a continuation-in-part (CIP) application of U.S. application Ser. No. 15/861,290, filed on Jan. 3, 2018, now U.S. Pat. No. 10,660,478, issued on May 26, 2020, which claims priority under 35 U.S.C § 119(e) to U.S. Provisional Application Ser. No. 62/441,702, which was filed on Jan. 3, 2017, and U.S. Provisional Application Ser. No. 62/521,503, which was filed on Jun. 18, 2017, the entire contents of each of these applications is incorporated herein by reference.

BACKGROUND

1. Field of the Disclosure

The present disclosure relates to a handle, and more particularly, to a removable handle for a cooking utensil.

2. Description of the Related Art

Removable handles that are configured to attach to one or more types of cooking utensils, e.g., a frying pan or a pan that is configured for oven, broiler, or barbeque grill use, are known. Such handles, typically, include a proximal end having a gripping surface, a distal end having one or more protrusions or surfaces for attaching to the cooking utensil, and an elongated shaft that extends from the proximal end to the distal end to facilitate attaching the distal end of the removable handle to a cooking utensil. However, in certain instances, e.g., when the cooking utensil is a pan that needs to be taken from a stove top to an oven with multiple racks, the shaft can sometimes make it difficult for a user to position the pan on one of the racks and then unattach the handle from the pan.

SUMMARY

The present disclosure has been made to address at least the disadvantages described above and to provide at least the advantages described below. Accordingly, an aspect of the present disclosure provides a removable handle for a cooking utensil.

In accordance with an aspect of the present disclosure, there is provided a removable handle for a cooking utensil. The removable handle includes a proximal end including a gripping surface, a distal end including a plurality of tines, and an elongated shaft extending from the proximal end to the distal end and being bent or curved along its length so that the distal end including the plurality of tines are oriented at an angle that ranges from about 75°-90° relative to the proximal end.

In accordance with another aspect of the present disclosure, there is provided a method for manufacturing a removable handle for a cooking utensil. The method includes forming a proximal end including a gripping surface, forming a distal end including a plurality of tines; and forming an elongated shaft that extends from the proximal end to the distal end and being bent so that the distal end including the plurality of tines are oriented at an angle that is greater than 45° relative to the proximal end.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Various embodiments of the present disclosure will now be described in detail with reference to the accompanying drawings. In the following description, specific details such as detailed configuration and components are merely provided to assist in the overall understanding of these embodiments of the present disclosure. Therefore, it should be apparent to those skilled in the art that various changes and modifications of the embodiments described herein can be made without departing from the spirit and scope of the present disclosure. In addition, descriptions of well-known functions and constructions are omitted for clarity and conciseness.

Figure 1:
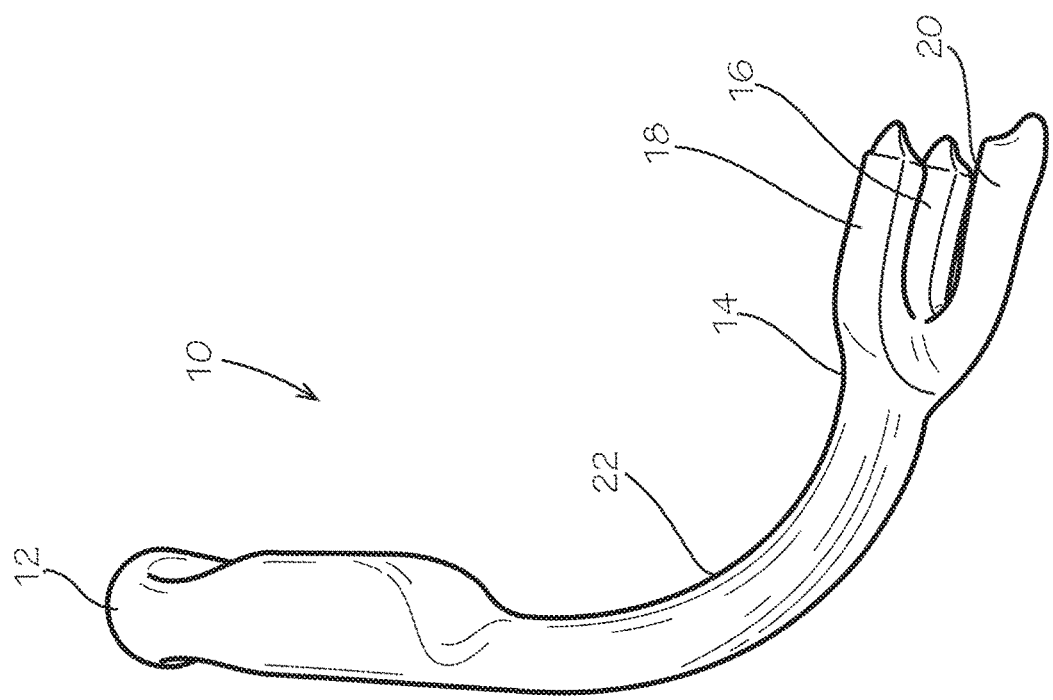
FIG. 1 is a perspective view of a removable handle configured for use with a cooking utensil, in accordance with an embodiment of the present disclosure.

FIG. 1 is a perspective view of a removable handle 10 configured for use with a cooking utensil, in accordance with an embodiment of the present disclosure.

The removable handle 10 can be made from any suitable material including, but not limited to, metal, ceramic, rubber, or plastic, or combination thereof. The removable handle 10 includes a proximal end 12 that can be used as a hand grip or gripping surface, and can be knurled and/or include one or more indents or detents to facilitate gripping thereof. The proximal end 12 can also be covered with or configured to attach to a plastic or other suitable cover. One or more apertures can be provided at the proximal end 12 and can be used for storing the removable handle 10 when it is not being used. For example, the one or more apertures can be configured to receive a hook from a pot rack, or to provide some utility, such as being used as a bottle opener.

A distal end 14 of the removable handle 10 includes a plurality of tines that are configured to attach to the cooking utensil. Three tines including two outer tines 16, 18 that are disposed on opposite sides of a middle tine 20 are shown in the drawings; however, more or fewer tines can be provided. The outer tines 16, 18 have lengths that that may be generally equal to each other, but may have lengths that are greater than a length of the middle tine 20; this facilitates in attaching the removable handle 10 to a cooking utensil. Other than the relative sizes of the outer tines 16, 18 and the middle tine 20, these tines are identical to one another; although, it may prove advantageous to provide outer tines 16, 18 with a configuration that is different from a configuration of the middle tine 20. For example, the outer tines 16, 18 can include tips having a concave configuration (which can serve as claw for gripping a cooking utensil), while a tip of the middle tine 20 can include a convex configuration, which can also serve as a claw. Other tip configurations are envisioned.

The outer tines 16, 18 are positioned in a first plane, and are spaced from the middle tine 20 which is positioned in a second plane. The first plane is parallel to and offset from the second plane which enables the tines 16, 18 to fit over the lip or edge of a pan, as described below.

Figure 2:
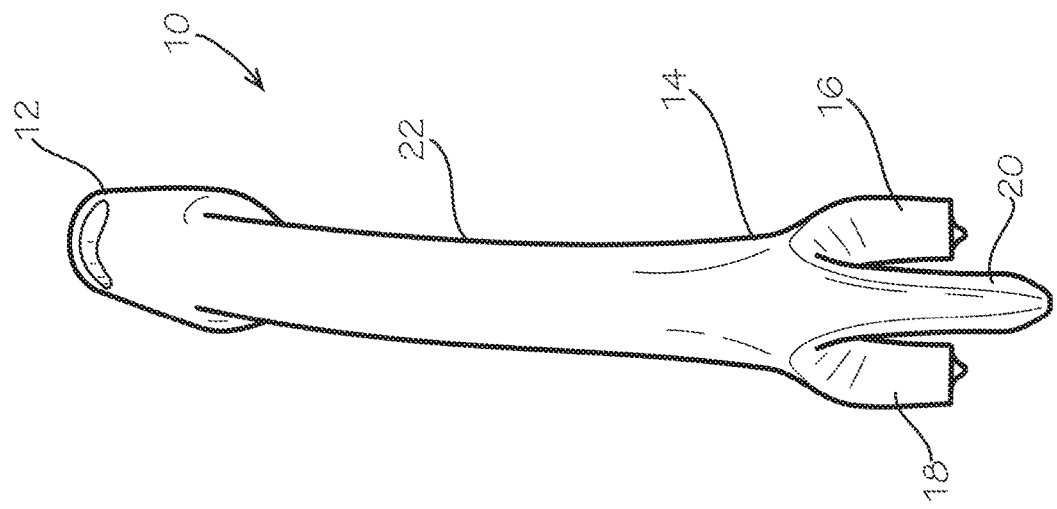
FIG. 2 is a front view of a removable handle, in accordance with an embodiment of the present disclosure.

An elongated shaft 22 extends from the proximal end 12 to the distal end 14 and includes a bent configuration. More particularly, the elongated shaft 22 is bent so that the distal end 14 including the outer tines 16, 18 and the middle tine 20 are oriented at an angle that is greater than 45°, and ranges from about 75°-90° relative to the proximal end 12 (see FIG. 2, for example).

Although it has been shown through experimentation that the removable handle 10 works particularly well when it is bent at an angle that ranges from about 85°-90° relative to the proximal end 12, the elongated shaft 22 can be bent at other suitable angles.

For example, the elongated shaft 22 can be bent so that the distal end 14 is oriented at an angle greater than 90° with respect to the proximal end (e.g., 95°-135°). This orientation is allows for the proximal end 12 to be relatively close to the pan 26 when the removable handle 10 is attached to the pan 26, thereby improving the user's ability to control the movement of the pan 26.

The elongated handle 10 can be manufactured via any suitable manufacturing process. For example, the removable handle 10 can be monolithically formed via a forging (hot or cold) process or casting process. When the handle 10 is constructed of plastic, it can be molded in a conventional manner. Alternatively, the proximal end 12, the elongated shaft 22, and the distal end 14 can be formed separately (e.g., via the forging or casting processes), and subsequently assembled by connecting these components to each other.

Figure 3:
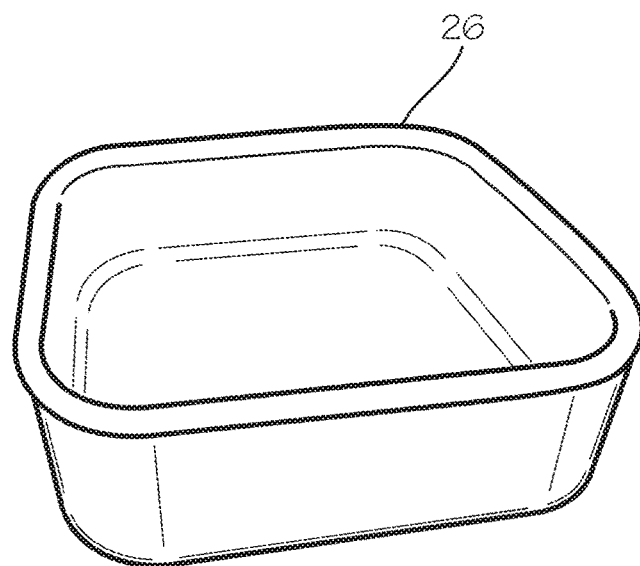
FIG. 3 is a perspective view of a pan that a removable handle is configured to attach to, in accordance with an embodiment of the present disclosure.
Figure 4:
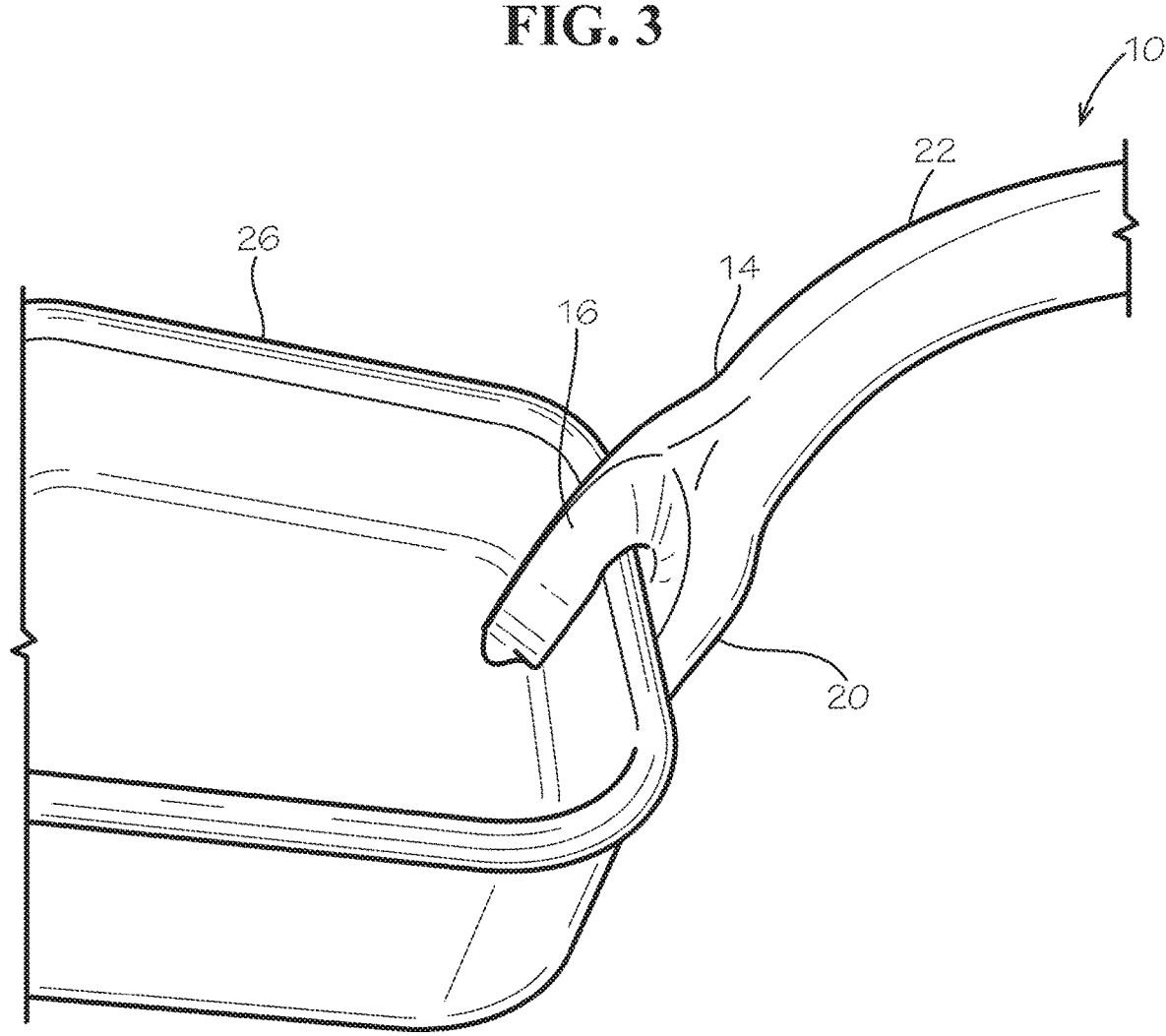
FIG. 4 is a perspective view of a removable handle attached to a pan, in accordance with an embodiment of the present disclosure.

In use, the outer tines 16, 18 and middle tine 20 of the distal end 14 can be attached to one or more cooking utensils, e.g., a pan 26 as shown in FIG. 3. The pan 26 can be round, oval, rectangular, square, or any other geometric configuration. While pan 26 is shown having a lip that extends along a perimeter of an upper edge thereof, such a configuration is not required for the removable handle 10 to operate as described herein.

When a user wants to attach the removable handle 10 to the pan 26, e.g., to move the pan 26 from a stove top to an oven, or remove a pan from a broiler or a barbeque, the user can simply position the lip of the pan 26 between the outer tines 16, 18 and the middle tine 20. With the lip of the pan 26 positioned between the outer tines 16, 18 and the middle tine 20, the weight of the pan 26 and the bend of the elongated shaft 22 keeps the lip of the pan 26 pressed against the outer tines 16, 18 and the middle tine 20, and the user can lift the pan 26.

Various methods can be used to manufacture the removable handle 10. For example, in accordance with the present disclosure, the removable handle can be manufactured via a method that includes forming a proximal end including a gripping surface, forming a distal end including a plurality of tines, and forming an elongated shaft that extends from the proximal end to the distal end and that is bent so that the distal end including the plurality of tines are oriented at an angle of greater than 45°, or at an angle that ranges from about 75°-90° relative to the proximal end. As noted above, the proximal end 12, elongated shaft 22, and distal end 14 can be formed as one unit.

Figure 6:
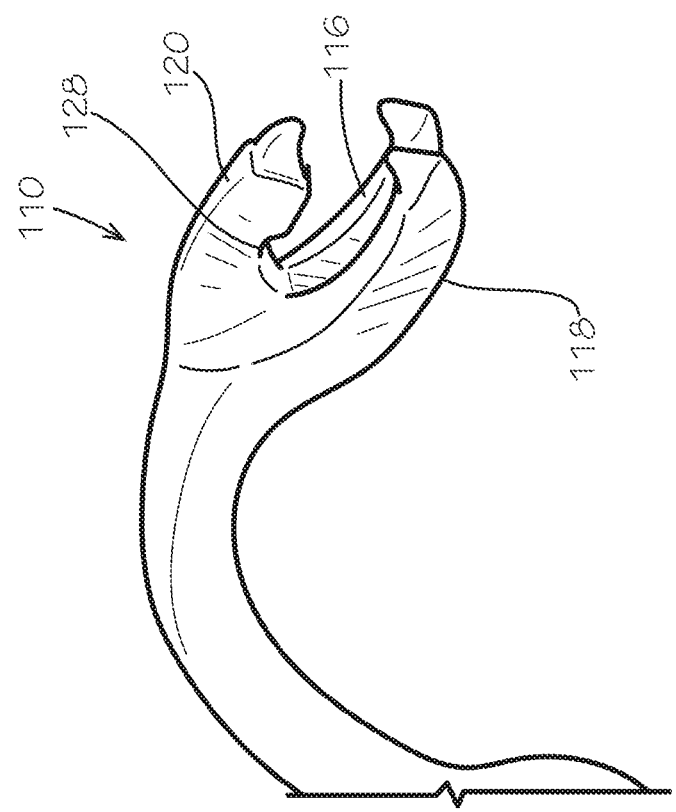
FIG. 6 is a partial, perspective view of a removable handle of FIG. 5, in accordance with an embodiment of the present disclosure.
Figure 5:
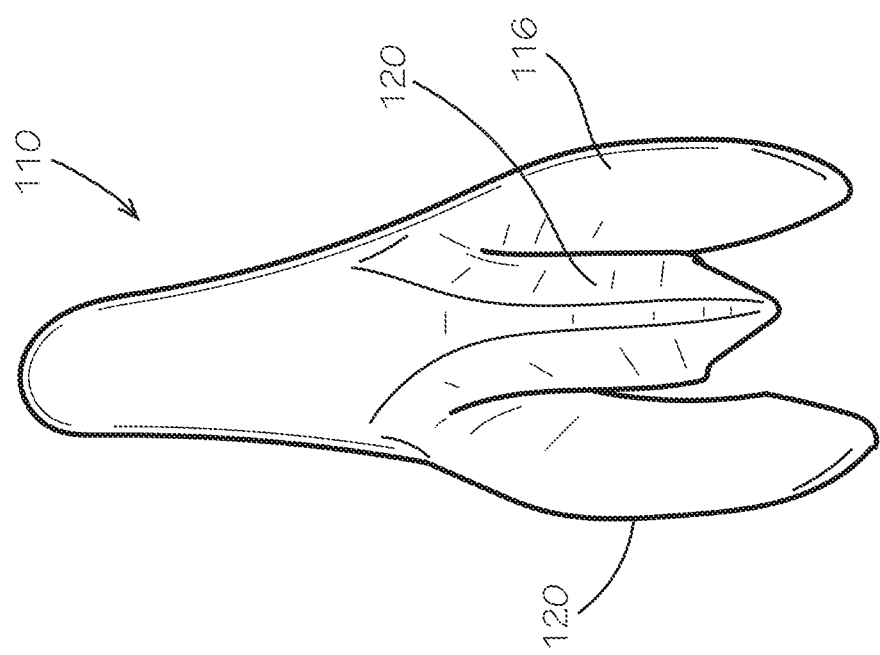
FIG. 5 is a front view of a removable handle, in accordance with an embodiment of the present disclosure.

Moreover, FIGS. 5 and 6 illustrate a removable handle 110, in accordance with an embodiment of the present disclosure. The removable handle 110 is similar to the removable handle 10, and only those features that are unique to the removable handle 110 are described herein. The removable handle 110 can be bent at the angles described above with respect to the removable handle 10, but is bent in a direction opposite of the removable handle 10. The removable handle 110 includes outer tines 116, 118 that are disposed on opposite sides of a middle tine 120, which is shorter than the outer tines 116, 118. The outer tines 116, 118 and middle tine 120 include a generally arcuate configuration to facilitate maintaining the lip of the pan 26 in a pressed configuration against the outer tines 116, 118 and the middle tine 120. Additionally, an arcuate notch 128 is disposed at a proximal end of the middle tine 120. The arcuate notch 128 is configured to engage (or receive) the lip of the pan 26 when the lip is positioned between the outer tines 116, 118 and the middle tine 120; this also facilitates maintaining the lip of the pan 26 in a pressed configuration against the outer tines 116, 118 and the middle tine 120. The outer tines 116, 118 can also include an arcuate notch 128.

Figure 7:
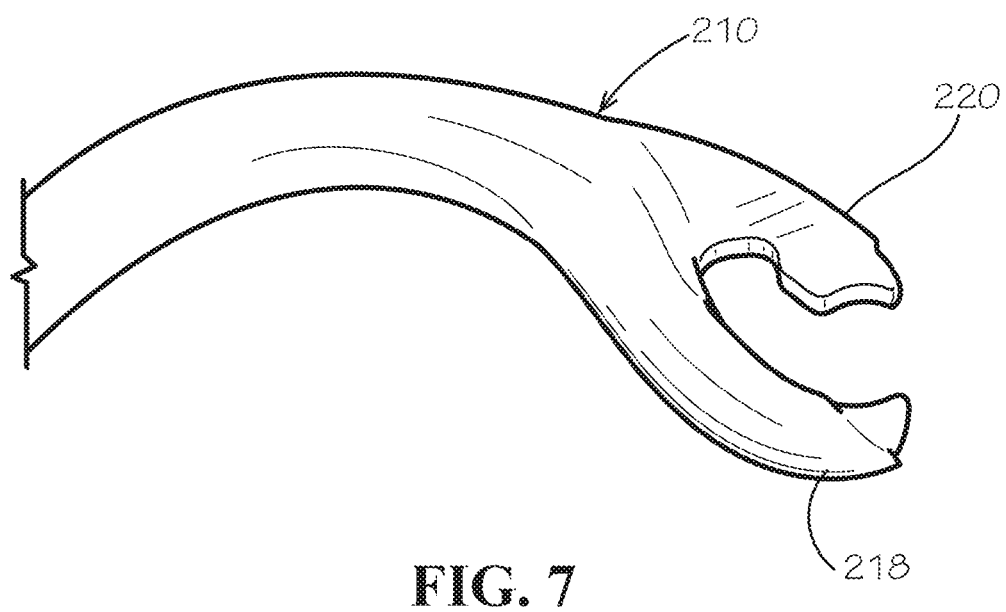
FIG. 7 is a partial, side view of a removable handle, in accordance with an embodiment of the present disclosure.

Furthermore, FIG. 7 illustrates a removable handle 210, in accordance with an embodiment of the present disclosure. The removable handle 210 is similar to the removable handle 110, and only those features that are unique to the removable handle 210 are described herein.

The removable handle 210 includes two outer tines (only outer tine 218 is shown in FIG. 7) and a middle tine 220, which is thinner than the outer tines; however, the outer tines can be as thin as the middle tine 220.

The removable handles 110, 210 can be used in a manner similar to that of the removable handle 10.

Figure 8:
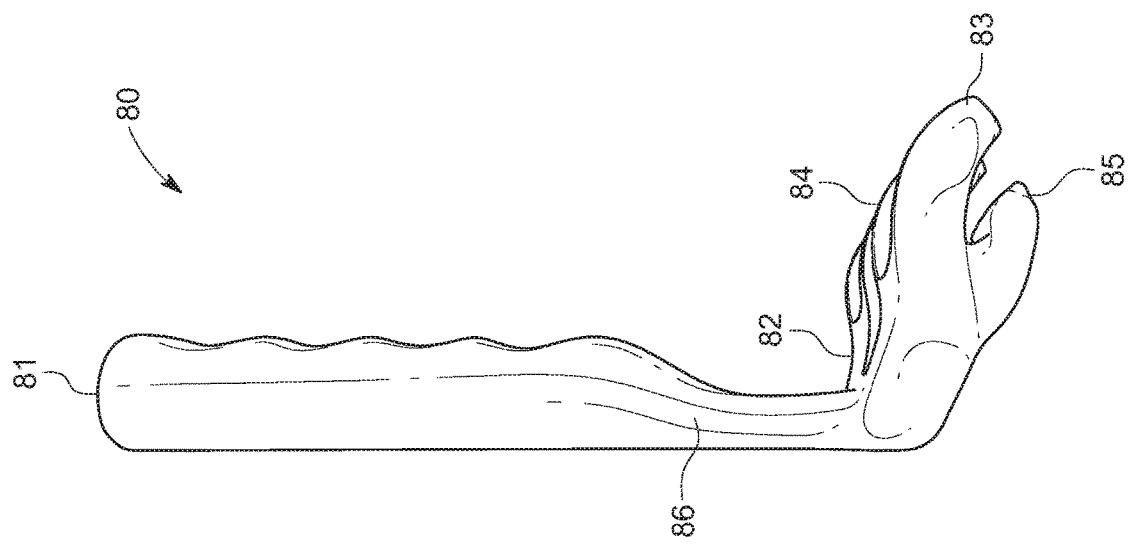
FIG. 8 is a perspective view of a removable handle, in accordance with an embodiment of the present disclosure.

FIG. 8 is a perspective view of a removable handle, in accordance with an embodiment of the present disclosure.

The removable handle 80, shown in FIG. 8, can be made from any suitable material including, but not limited to, metal, ceramic, rubber, or plastic, or combination thereof. The removable handle 80 includes a proximal end 81 that can be used as a hand grip or gripping surface, and can be knurled and/or include one or more indents or detents to facilitate gripping thereof. The proximal end 81 can also be covered with or configured to attach to a plastic or other suitable cover. One or more apertures can be provided at the proximal end 81 and can be used for storing the removable handle 80 when it is not being used. For example, the one or more apertures can be configured to receive a hook from a pot rack, or to provide some utility, such as being used as a bottle opener.

Figure 9:
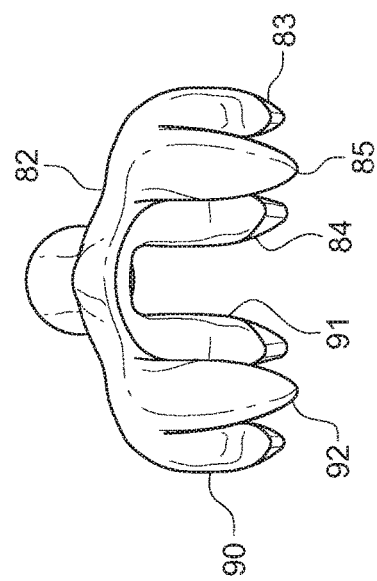
FIG. 9 is a front view of a removable handle, in accordance with an embodiment of the present disclosure.

A distal end 82 of the removable handle 80 includes a plurality of tines that are configured to attach to the cooking utensil. The plurality of tines may be grouped into various formations. That is, referring to FIG. 9, two sets of three tines with each set including two outer tines 83, 84 that are disposed on opposite sides of a middle tine 85 are shown in the drawings; however, more or fewer tines can be provided (e.g., one middle tine and one outer tine, or two middle tines and four outer tines). The outer tines 83, 84 have lengths that that may be generally equal to each other, but may have lengths that are greater than a length of the middle tine 85; this facilitates in attaching the removable handle 80 to a cooking utensil. Other than the relative sizes of the outer tines 83, 84 and the middle tine 85, these tines are identical to one another; although, it may prove advantageous to provide outer tines 83, 84 with a configuration that is different from a configuration of the middle tine 85. For example, the outer tines 83, 84 can include tips having a concave configuration (which can serve as claw for gripping a cooking utensil), while a tip of the middle tine 85 can include a convex configuration, which can also serve as a claw. Other tip configurations are envisioned.

The outer tines 83, 84 are positioned in a first plane, and are spaced from the middle tine 85 which is positioned in a second plane. Additionally or alternatively, a first set of outer tines 83, 84 may be positioned in a first plane, and spaced from a middle tine 85 which is positioned in a second plane; and a second set of outer tines 90, 91 may be positioned in the first plane, and spaced from a middle tine 92 which is positioned in the second plane. The first plane is parallel to and offset from the second plane which enables the tines 83, 84 (and/or 90, 91) to fit over the lip or edge of a pan.

Figure 10:
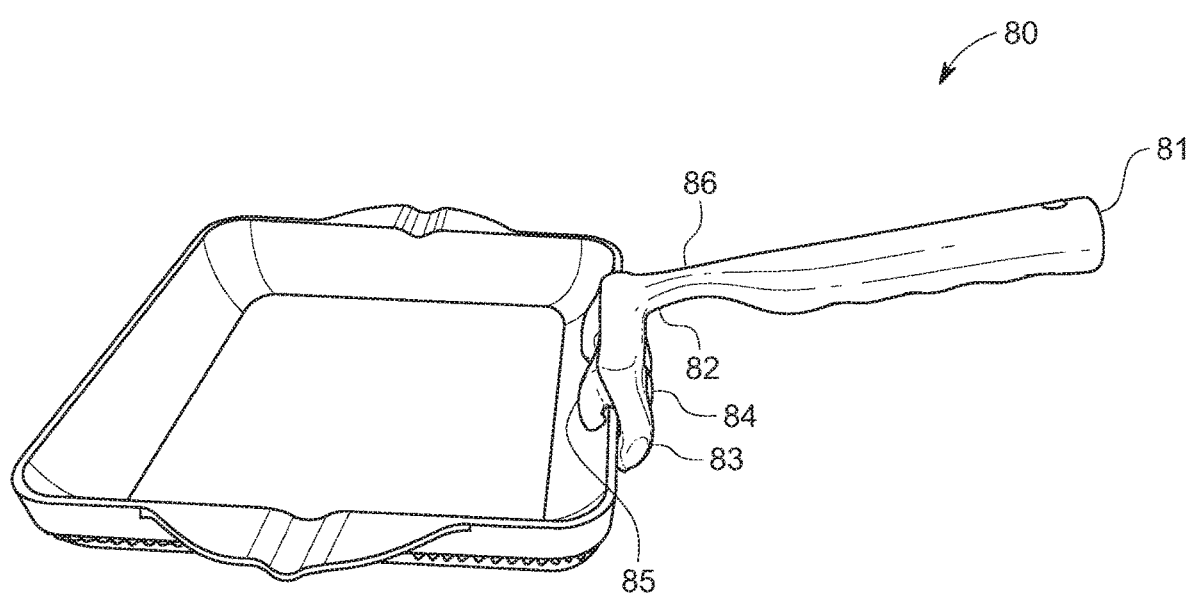
FIG. 10 is a perspective view of a removable handle attached to a pan, in accordance with an embodiment of the present disclosure.

An elongated shaft 86 extends from the proximal end 81 to the distal end 82 and is configured to be straight for the entire length from the proximal end 81 up to the distal end 82. More particularly, the distal end 82 including the outer tines 83, 84 and the middle tine 85 and/or the outer tines 90, 91 and the middle tine 92 is formed so that the elongated shaft 86 is oriented at an angle that is greater than 45°, and ranges from about 75°-90° relative to the distal end 82. Additionally, the proximal end 81 is oriented in the same manner as the elongated shaft 86 with respect to the distal end 82 because the elongated shaft 86 and the proximal end 81 are formed to be straight (see FIGS. 8-10, for example).

Figure 11:
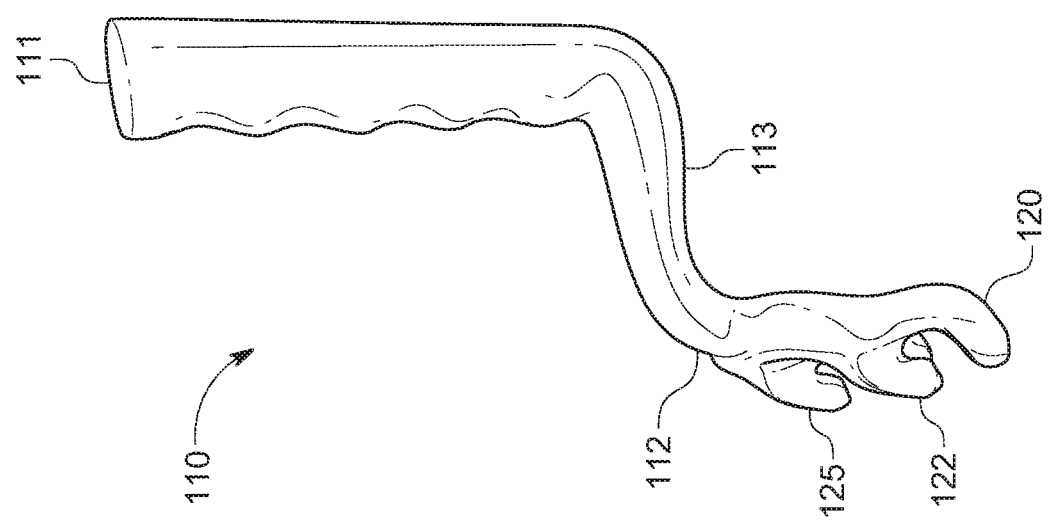
FIG. 11 is a perspective view of a removable handle, in accordance with an embodiment of the present disclosure.
Figure 13:
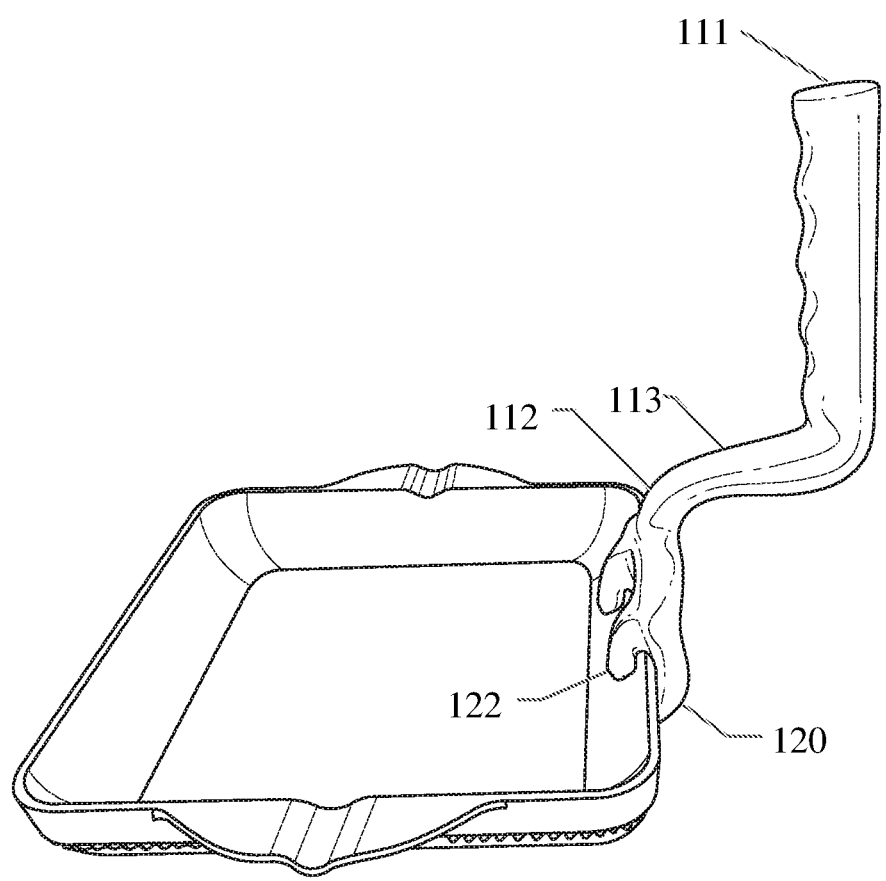
FIG. 13 is a perspective view of a removable handle attached to a pan, in accordance with an embodiment of the present disclosure.

FIG. 11 is a perspective view of a removable handle, in accordance with an embodiment of the present disclosure.

The removable handle 110, shown in FIG. 11, can be made from any suitable material including, but not limited to, metal, ceramic, rubber, or plastic, or combination thereof. The removable handle 110 includes a proximal end 111 that can be used as a hand grip or gripping surface, and can be knurled and/or include one or more indents or detents to facilitate gripping thereof. The proximal end 111 can also be covered with or configured to attach to a plastic or other suitable cover. One or more apertures can be provided at the proximal end 111 and can be used for storing the removable handle 110 when it is not being used. For example, the one or more apertures can be configured to receive a hook from a pot rack, or to provide some utility, such as being used as a bottle opener.

Figure 12:
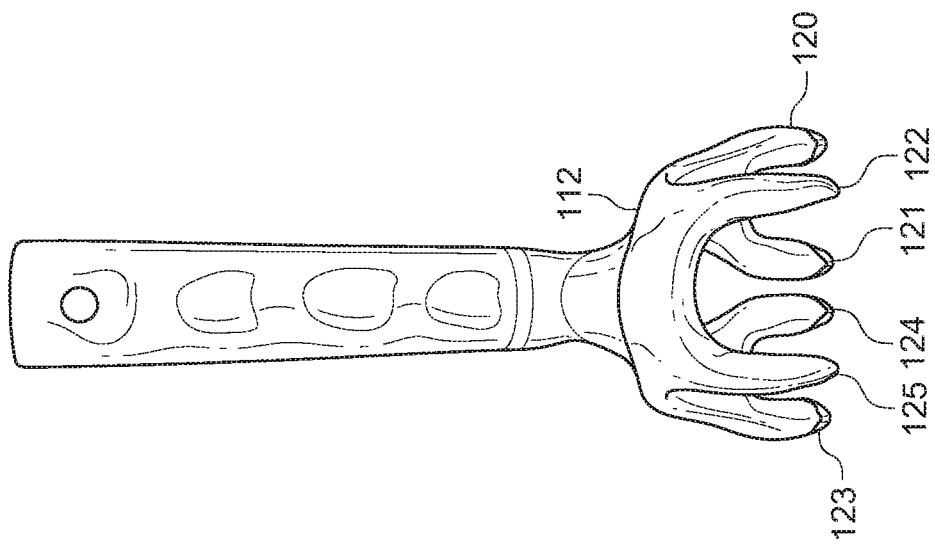
FIG. 12 is a front view of a removable handle, in accordance with an embodiment of the present disclosure.

A distal end 112 of the removable handle 110 includes a plurality of tines that are configured to attach to the cooking utensil. The plurality of tines may be grouped into various formations. That is, referring to FIG. 12, two sets of three tines with each set including two outer tines 120, 121 that are disposed on opposite sides of a middle tine 122 are shown in the drawings; however, more or fewer tines can be provided (e.g., one middle tine and one outer tine, or two middle tines and four outer tines). The outer tines 120, 121 have lengths that that may be generally equal to each other, but may have lengths that are greater than a length of the middle tine 122; this facilitates in attaching the removable handle 110 to a cooking utensil. Other than the relative sizes of the outer tines 120, 121 and the middle tine 122, these tines are identical to one another; although, it may prove advantageous to provide outer tines 120, 121 with a configuration that is different from a configuration of the middle tine 122. For example, the outer tines 120, 121 can include tips having a concave configuration (which can serve as claw for gripping a cooking utensil), while a tip of the middle tine 122 can include a convex configuration, which can also serve as a claw. Other tip configurations are envisioned.

The outer tines 120, 121 are positioned in a first plane, and are spaced from the middle tine 122 which is positioned in a second plane. Additionally or alternatively, a first set of outer tines 120, 121 may be positioned in a first plane, and spaced from a middle tine 122 which is positioned in a second plane; and a second set of outer tines 123, 124 may be positioned in the first plane, and spaced from a middle tine 125 which is positioned in the second plane. The first plane is parallel to and offset from the second plane which enables the outer tines 120, 121 (and/or 123, 124) to fit over the lip or edge of a pan.

An elongated shaft 113 extends from the proximal end 111 to the distal end 112 and is configured to be bent with respect to the proximal end 111 and bent with respect to the distal end 112. That is, the elongated shaft 113 forms a first angle that is greater than 45° (e.g., 75°-90°) with respect to the distal end 112. Additionally, the elongated shaft 113 forms a second angle that is less than −45° (315°) (e.g., −75° (285°) to −90° (270°)) with respect to the proximal end 111. The sum of the first angle and the second angle is zero, such that the proximal end 111 is orientated in the same direction as the distal end 112. The proximal end 111 is oriented in a plane that is parallel with a plane in which the distal end 112 is oriented in.

In use, since the proximal end 111 is where a user grips the removable handle 110, the user's grip is substantially perpendicular to a bottom surface of the pan. In this orientation, the user's grip is a power grip that allows the user to lift the pan using muscles in user's arm or shoulder instead of the user's wrist. The power grip orientation is particularly useful for lifting heavy objects.

Figure 14:
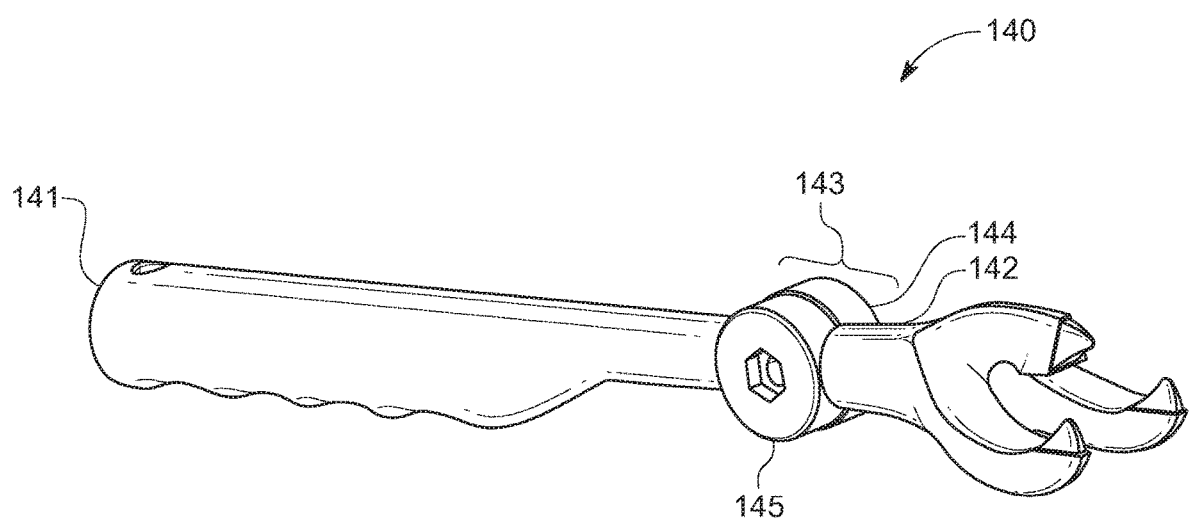
FIG. 14 is a perspective view of a rotatable removable handle in a first position, in accordance with an embodiment of the present disclosure.

FIG. 14 is a perspective view of a rotatable removable handle in a first position, in accordance with an embodiment of the present disclosure.

Referring to FIG. 14, a rotatable removable handle 140 is configured so that an angle of orientation of a proximal end 141 may be adjusted with respect to a distal end 142. In particular, a first position is shown in FIG. 14 in which an angle of orientation of the proximal end 141 with respect to the distal end 142 is approximately 00. That is, the proximal end 141 is configured to be substantially in line (i.e., straight) with respect to the distal end 142.

Figure 15:
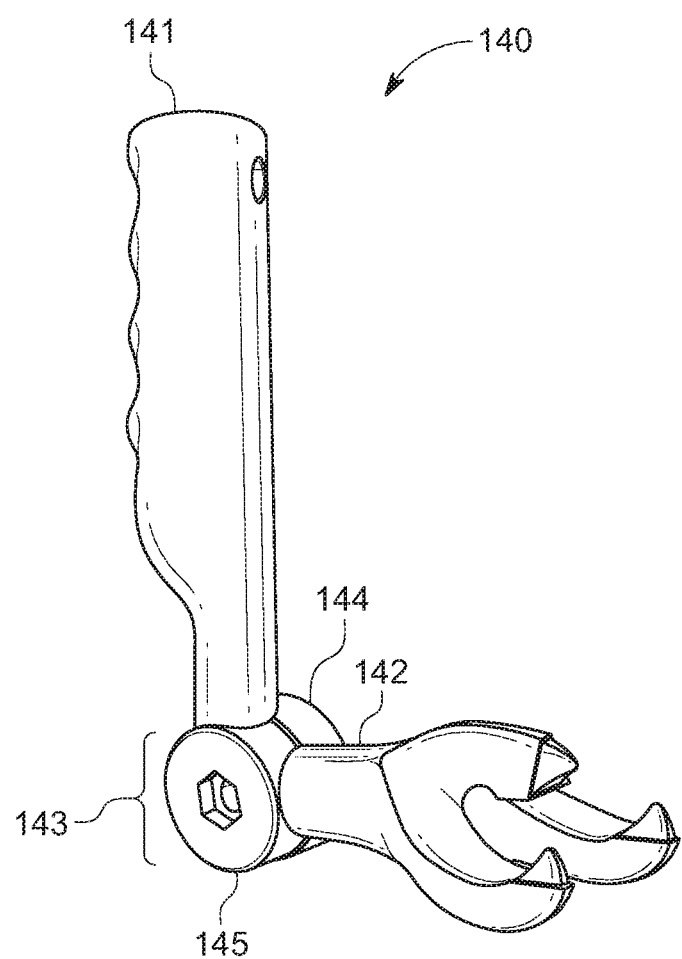
FIG. 15 is a perspective view of a rotatable removable handle in a second position, in accordance with an embodiment of the present disclosure.

FIG. 15 is a perspective view of a rotatable removable handle in a second position, in accordance with an embodiment of the present disclosure.

Referring to FIG. 15, the rotatable removable handle is positioned in a second position such that an angle of orientation of the proximal end 141 is about 90° with respect to the distal end 142.

The rotatable removable handle 140, as illustrated in FIGS. 14-15, includes a cylindrical rotation joint 143 positioned between the proximal end 141 and the distal end 142. That is, the rotation joint 143 connects the proximal end 141 to the distal end 142. In particular, as will be described with reference to FIGS. 16-17, the rotation joint 143 is made up of two or more pieces that connect to the proximal end 141 and the distal end 142.

Figure 16:
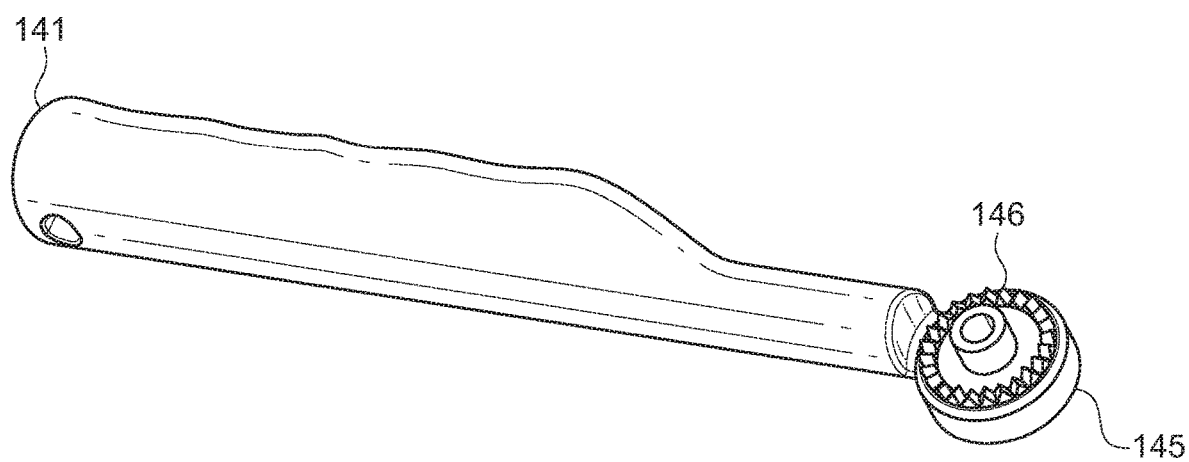
FIG. 16 is a perspective view of a proximal end of the rotatable removable handle separated from a distal end, in accordance with an embodiment of the present disclosure.
Figure 17:
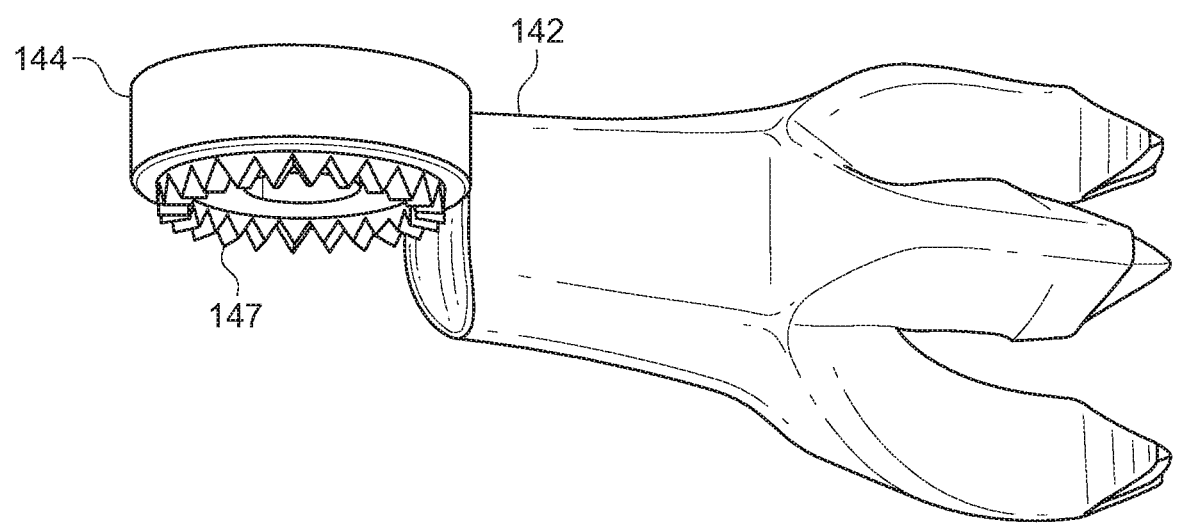
FIG. 17 is a perspective view of a distal end of the rotatable removable handle separated from a proximal end, in accordance with an embodiment of the present disclosure.

When separated from the distal end 142, the proximal end 141 of the rotatable removable handle 140 includes a first side 145 of the rotation joint 143 opposite to the end of the proximal end 141 that includes a handle for gripping the proximal end 141. As shown in FIG. 16, the first side 145 of the rotation joint 143 includes a first set of teeth 146 along the circumference of the inner side of the first side 145 of the rotation joint 143. Additionally, towards the center of the first side 145 of the rotation joint 143, an outwardly protruding cylindrical piece is shown. The outwardly protruding cylindrical piece may be hollow to allow a shank or some other attachment mechanism to be inserted inside of the hollow area for attachment to a second side 144 of the rotation joint 143.

The second side 144 of the rotation joint 143 is connected to an end of the distal end 142 that is opposite to the end of the distal end 142 that includes the talons for picking up the pan. The second side 144 of the rotation joint 143 includes a second set of teeth 147 along the circumference of the inner side of the second side 144 of the rotation joint 143. Additionally, towards the center of the second side 144 of the rotation joint 143, a hollow spherical area is provided in which the outwardly protruding spherical piece of the first side 145 of the rotation joint 143 may be inserted into.

When the outwardly protruding spherical piece of the first side 145 is inserted into the hollow spherical area of the second side 144 of the rotation joint 143, the first set of teeth 146 come into contact with the second set of teeth 147 to form the rotation joint 143. Therefore, an angle of orientation of the proximal end 141 with respect to the distal end 142 may be adjusted by detaching the proximal end 141 from the distal end 142 and manually adjusting the angle of orientation by moving the first side 145 of the rotation joint 143 with respect to the second side 144 of the rotation joint 143 in a circular direction.

Once a desired angle of orientation is achieved, then the first side 145 and the second side 144 of the rotation joint 143 may be pressed together such that the outwardly protruding cylindrical piece is inserted into the hollow cylindrical piece, thereby causing the first set of teeth 146 to come into contact with the second set of teeth 147.

In order to lock the proximal end 141 to the distal end 142 after the desired angle of orientation is achieved, a user may bolt the first side 145 to the second side 144 using screw with a washer, a shank, or any other conventional method for attachment.

Due to the ability to manually adjust the angle of orientation described above, a user may set an orientation to be nearly any angle within a 360° range up to a point in which the proximal end 141 contacts the distal end 142, thereby restricting further rotation. This ability allows a user to choose his or her angle of orientation in a relatively easy to use manner by disconnecting the proximal end 141 from the distal end 142 and then attaching the proximal end 141 to the distal end 142 once a desired angle of orientation is achieved. Choosing a preferred angle of orientation is advantageous to a user because it allows him or her to create a handle that is best suited for his or her height, strength, another body characteristic, or to the pot or pan he or she is picking up.

Additionally, the rotatable removable handle 140 shown in FIGS. 14-17 includes a single set of talons (e.g., two outer talons on a first plane and one middle talon on a second plane). Through experimentation, it has been determined that a single set of talons is more advantageous to picking up a variety of different types of pots or pans because the edge and depth of pots and pans vary. Thus, by only using a single set of talons, a wider range edges of various cooking items may fit between the outer talons and middle talon, thereby facilitating attachment of the rotatable removable handle 140 to a pot or pan.

However, more or less talons (e.g., more than one set of talons) may be attached to the distal end 142 of the rotatable removable handle 140 for use in picking up a pot or pan.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A removable handle for a cooking utensil, the removable handle comprising:
   a center member positioned between a first bent shaft and a second bent shaft;
   a proximal end including a gripping surface, and
   a distal end including a plurality of tines including at least two outer tines and a middle tine, wherein the middle tine is positioned in a plane that is offset from a plane in which the at least two outer tines are positioned,
   wherein the first bent shaft extends from a first end of the center member to the distal end and being bent so that the distal end including the plurality of tines are oriented at a first angle that is greater than 45° relative to the center member, and
   wherein the second bent shaft extends from the proximal end to a second end of the center member and being bent so that the center member is oriented at a second angle that is greater than 45° relative to the proximal end.

2. The removable handle of claim 1, wherein the first angle is in a range from 75°-90° relative to the proximal end.

3. The removable handle of claim 1, wherein the second angle is in a range from 75°-90° relative to the proximal end.

4. The removable handle of claim 1, wherein the at least two outer tines are disposed on opposite sides of the middle tine.

5. The removable handle of claim 4, wherein the middle tine is one of longer than or shorter than the at least two outer tines.

6. The removable handle of claim 4, wherein the middle tine includes a tip having a convex configuration and the at least two outer tines include tips having a concave configuration.

7. The removable handle of claim 4, wherein the plane in which the middle tine is positioned is parallel to the plane in which the outer tines are positioned.

8. The removable handle of claim 1, wherein the removable handle is made from a material selected from the group consisting of metal, ceramic, and plastic.

9. The removable handle of claim 1, wherein the plurality of tines further include at least four outer tines and two middle tines, wherein the middle tines are positioned in a plane that is offset from a plane in which the at least four outer tines are positioned.

10. The removable handle of claim 1, wherein a distance between the plane including the at least two outer tines is adjustable with respect to the plane including the middle tine.

11. A removable handle for a cooking utensil, the removable handle comprising:
    a proximal member having a first end that includes a gripping surface and a second end that includes a first connection member; and
    a distal member including a first end that includes a second connection member and a second end that includes a plurality of tines including at least two outer tines and a middle tine, wherein the middle tine is positioned in a plane that is offset from a plane in which the at least two outer tines are positioned,
    wherein the first connection member is configured to attach to and detach from the second connection member.

12. The removable handle of claim 11, wherein the first connection member is configured to attach to the second connection member according to a friction-based locking mechanism.

13. The removable handle of claim 11, wherein the first connection member includes a plurality of teeth on a first surface thereof and the second connection member includes a plurality of teeth on a second surface thereof, and
    wherein the first connection member is configured to attach to the second connection member by orientating the first surface to face the second surface such that the plurality of teeth on the first surface contacts the plurality of teeth on the second surface and applying a force to prevent the first surface from separating from the second surface.

14. The removable handle of claim 11, wherein an angle of orientation at which the first connection member attaches to the second connection member is capable of being adjusted in a range from 0° to, at least, 270°.

15. The removable handle of claim 11, wherein an angle of orientation at which the first connection member attaches to the second connection member is capable of being adjusted in a range that is greater than 180°.

* * * * *